United States Patent [19]

Bronstert et al.

[11] Patent Number: 5,064,907

[45] Date of Patent: Nov. 12, 1991

[54] POLYMERS WITH FUNCTIONAL GROUPS

[75] Inventors: Klaus Bronstert, Carlsberg; Daniel Wagner, Bad Duerkheim, both of Fed. Rep. of Germany

[73] Assignee: BASF Aktiengesellschaft, Ludwigshafen, Fed. Rep. of Germany

[21] Appl. No.: 576,196

[22] Filed: Aug. 30, 1990

Related U.S. Application Data

[63] Continuation of Ser. No. 228,721, Aug. 5, 1988, abandoned.

[30] Foreign Application Priority Data

Aug. 7, 1988 [DE] Fed. Rep. of Germany ....... 3726285

[51] Int. Cl.$^5$ .............................................. C08F 8/30
[52] U.S. Cl. ............................. 525/332.9; 525/54.1; 525/54.11; 525/333.1; 525/333.2; 525/333.3; 525/333.6; 525/359.4
[58] Field of Search ................ 525/333.1, 333.2, 54.1, 525/54.11, 332.9, 333.3, 333.6

[56] References Cited

U.S. PATENT DOCUMENTS 3,775,378 11/1973 Dahlmans et al. ............... 525/54.11
4,680,339  7/1987 Fong ................................. 525/54.11

*Primary Examiner*—Bernard Lipman
*Attorney, Agent, or Firm*—Keil & Weinkauf

[57] ABSTRACT

Modified homopolymer, random copolymers and/or block copolymers of aromatic vinyls and/or dienes contain functional groups of the general formula (I):

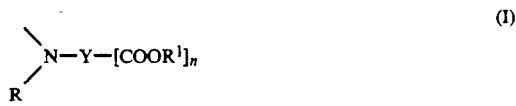

where N is nitrogen, O is oxygen, Y is a substituted or unsubstituted bridge which besides carbon additionally contains N- or O-members, R is any desired organic radical, $R^1$ is hydrogen, alkyl, cycloalkyl or aryl, and n is a whole number greater than or equal to 1, are prepared from living anionically polymerized or from alkali metallized homopolymers, random copolymers and/or block copolymers of aromatic vinyls and/or dienes which, reacted with organic nitrogen compounds, have a nitrogen-alkali metal bond by reaction of polymers of the general formula (II) in the presence of a polar or apolar solvent with compounds of the general formula (III) where Me is an alkali metal, X is halogen and Y, O, N, R, n and $R^1$ (other than hydrogen) have the abovementioned meanings

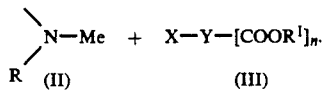

3 Claims, No Drawings

POLYMERS WITH FUNCTIONAL GROUPS

This application is a continuation of application Ser. No. 228,721, filed on Aug. 5, 1988 now abandoned.

The present invention relates to functionally modified homopolymers, random copolymers and/or block copolymers of aromatic vinyls and/or dienes and to the preparation thereof from living, anionically polymerized, or from alkali metallized homopolymers, random copolymers and/or block copolymers of aromatic vinyls and/or dienes by way of a reaction with organic nitrogen compounds to form an N-metal bond.

Functionally modified polymers of aromatic vinyls and/or dienes and the preparation thereof from the corresponding living, anionically polymerized, or from alkali metallized, polymers have been known for a long time. The art accordingly knows a large number of electrophilic substances which not only terminate living polymer chains but also introduce a functional group into the polymer. For instance, polymers having hydroxyl, carboxyl, thiol or halogen groups can be prepared by reaction of living polymers with compounds such as epoxies, aldehydes, ketones, carbon dioxide, anhydrides, cyclic sulfides, disulfides or halogen.

The functionalization with carboxyl groups by reaction of living polymers with carbon dioxide has likewise been described in detail (cf. Advances in Polymer Science, Anionic Polymerization 56, 70–72, Springer-Verlag, Berlin-Heidelberg [1984]).

The disadvantage of existing processes for the introduction of carboxyl groups is that the reaction with $CO_2$ in apolar hydrocarbons always leads to side reactions. They essentially comprise coupling reactions leading to the formation of compounds of higher molecular weight (for example ketones or carbinols).

GB Patent 921,803 and U.S. Pat. No. 3,227,701 disclose suppressing these side reactions by bringing the solution of living polymers briefly into very intensive contact with $CO_2$. The proposed means are specific mixing units or rotating disks.

An improvement in the reaction yield can likewise be obtained by using larger amounts of polar solvent components, for example tetrahydrofuran. However, use of polar solvent components has, as is known to those skilled in the art, an adverse effect on the microstructure of anionically polymerized dienes, for example butadiene.

It has hitherto not been possible to obtain complete suppression of unwanted side reactions and quantitative functionalization with carboxyl groups.

It is an object of the present invention to specify a specific, high-yield reaction for preparing polymers comprising aromatic vinyl and/or diene units and having at least one carboxyl or ester group and/or end group. It is a further object to carry out the reaction, if possible, in apolar solvents, in particular in an aliphatic, cycloaliphatic and/or aromatic hydrocarbon, and using a stoichiometric quantity or small excess of a readily accessible carboxylating reagent. It is another object to obtain polymers having carboxyl groups in a simple manner.

We have found that these objects are achieved with the polymer and with the process for preparing said polymer hereinafter disclosed.

In the polymer having the functional groups of the formula (I), Y is preferably a branched or unbranched hydrocarbon chain of from 1 to 20 carbon atoms which may in addition contain aromatic members, $R^1$ is preferably hydrogen or branched or unbranched alkyl of from 1 to 7 carbon atoms, R is any desired organic radical, for example methyl, n-butyl, tert-butyl, phenyl, benzyl, cyclohexyl, 6-dimethylaminohexyl, 4-dimethylaminophenyl, etc., and n is a whole number greater than or equal to 1, preferably from 1 to 3.

U.S. patent applications 06/889,372 now U.S. Pat. No. 4,753,991 and 07/030,487 now U.S. Pat. Nos. 4,791,174 propose the preparation of polymers having amino groups by reaction of lithium-containing polymers with specific nitrogen compounds. These nitrogen compounds are certain hydrazine derivatives and also compounds which have at least one

group. Examples are Schiff bases, carbodiimides and azines.

These reactions give rise to polymers which have one or more N-lithium groups and which, after hydrolysis or alcoholysis, are convertible into polymers having amino groups.

We have found, surprisingly, that the N-lithium-containing polymers are also suitable for reactions which make it possible to introduce carboxyl groups.

To this end, the process according to the invention comprises reacting polymers which have a nitrogen-lithium bond with compounds of the formula $$X—Y—[COOR^1]_n \qquad (III)$$

The compounds comprise halocarboxylic esters where the halogen is not directly bonded to the carbonyl carbon. In the formula III, $R^1$ is hydrogen, alkyl, cycloalkyl, or aryl, X is halogen (chlorine, bromine or iodine), chlorine being preferred, and Y is in the simplest case an unbranched hydrocarbon chain $[Y=H—(CH_2)_m]$, where m is a whole number equal to or greater than 1. The halogen X can be positioned along this chain at any desired location in place of a hydrogen. Preferably, however, ω-halocarboxylic esters are used.

Y may in addition also contain aromatic, cycloaliphatic and also further N- or O-members, with the restriction that halogen is not bonded directly to aromatic carbon.

The symbol Y in the formula III is similarly a further substituted or unsubstituted bridge which has more than one carboxylic ester group.

The halocarboxylic acids defined here are used in the form of esters of primary, secondary or tertiary alcohols, the secondary and tertiary esters being preferred. These alcohols may contain aliphatic, cycloaliphatic or aromatic members.

Suitable compounds according to the formula III are for example: tert-butyl 2-chloroacetate, isobutyl 3-chloropropionate, ethyl 11-bromoundecanoate, isobutyl 4-chloromethylbenzoate and diisobutyl bromosuccinate.

This list is not complete nor limiting.

For the purposes of the present invention, homopolymers, random copolymers and block copolymers of aromatic vinyls and/or dienes are the known polymers of this type which can be obtained anionically, for example by means of alkali organometallic initiators, from the corresponding monomers. Processes of this type are well-known, so that they need not be discussed here any further (cf. for example GB Patent 1,444,680 or J. Appl. Polym. Sci. 22 (1978), 2007-13).

Suitable aromatic vinyl is in particular styrene, the various alkylstyrenes or vinylnaphthalene, and suitable dienes are butadiene, isoprene, 2,3-dimethylbutadiene, piperylene, phenylbutadiene or other anionically polymerizable conjugated $C_4$-$C_{12}$-dienes. Besides the respective homopolymers it is also possible to use the known random copolymers and block copolymers of aromatic vinyls and dienes, the choice of initiator and procedure determining whether the monomers are present in the copolymers in block or random distribution.

The functionally modified homopolymers, random copolymer and/or block copolymer of an aromatic vinyl and/or diene of this invention contains functional groups of formula (I)

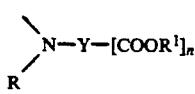
(I)

where Y is a substituted or unsubstituted bridge which besides carbon additionally contains N- or O-members, R is any desired organic radical, $R^1$ is alkyl, cycloalkyl or aryl, and n is a whole number greater than or equal to 1.

Preferably the polymer of this invention contains, per macromolecule, on average from 1 to 10 functional groups of formula (I).

The polymers of the invention are prepared by reacting a living anionically polymerized, or an alkali metallized, homopolymer, random copolymer and/or block copolymer of an aromatic vinyl and/or a diene with an organic nitrogen compound so as to prepare such a polymer which contains a nitrogen-alkali metal bond of formula (II)

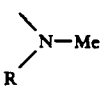
(II)

where Me is an alkali metal. Then the polymer of Formula II is reacted in the presence of a polar or apolar solvent with a compound of Formula III as set forth above.

The starting material for the novel polymers having the functional groups of the general formula (I) is prepared either from the living anionically polymerized or from alkali metallized homopolymers, random copolymers and/or block copolymers of aromatic vinyls and-/or dienes in a conventional manner.

To this end, the monomers are anionically polymerized in the presence of alkali metals or alkyl or aryl derivatives thereof, in particular in the presence of the alkyl derivatives of lithium, such as sec-butyllithium, in an inert solvent such as aliphatic, cycloaliphatic or aromatic hydrocarbons, in particular hexane, cyclohexane, benzene or toluene, or in the presence of tetrahydrofuran.

These processes give polymers which contain metal bonded to the end groups. However, it is also possible to prepare homopolymers, random copolymers and/or block copolymers of aromatic vinyls and/or dienes, which are subsequently metallized with alkali metals or derivatives thereof. Polymers metallized in this way contain the organometallic groups in random distribution along the chain.

Processes for metallizing unsaturated polymers and reacting the resulting metallized polymer with reactive chemical compounds are also described in U.S. Pat. Nos. 3,781,260 and 3,976,628.

Thereafter the above organometallic polymers are reacted with nitrogen compounds as described in U.S. patent applications 06/889,372 and 07/030,487 to give polymers (II) having N-alkali metal bonds, the alkali metal being preferably lithium.

According to the invention, in a second step these polymers (II) are reacted with halocarboxylic esters of the formula (III) in the presence of a solvent. Preferred solvents are aliphatic, cycloaliphatic or aromatic hydrocarbons such as hexane, cyclohexane, benzene, toluene, etc. Also suitable are ethers such as tetrahydrofuran, diethyl ether and others used customarily as solvents in anionic polymerization. Advantageously, the reaction is carried out in the same solvents as the polymerization of the monomers and the reaction with the nitrogen compounds.

The reaction of the N-lithium-containing polymers with halocarboxylic esters has a high rate and gives a high yield. It is of advantage that this reaction frequently requires little, if any, excess, so that the converted polymers are virtually uncontaminated by unconverted halogen compounds.

The novel polymers having carboxylic ester groups can readily be converted by hydrolysis with or without acid catalysis and elimination of the ester function into polymers having carboxylic acid groups, which in turn can be used for further reactions.

The polymers according to the invention can also be converted by hydrogenation into polymers in which the aliphatic unsaturated bonds are partly or wholly saturated.

The hydrogenation is preferably carried out with molecular hydrogen and catalysts based on metals or metal salts of group VIII of the periodic table. It can take place in heterogeneous phase, for example with Raney nickel, or in homogeneous phase with catalysts based on salts, in particular the carboxylates, alkoxides or enolates of cobalt, nickel or iron combined with metal alkyls, in particular aluminum alkyls.

The following Examples will illustrate the invention:
Characterization of polymers:

The number average molecular weights $M_n$ were determined by gel permeation chromatography (GPC) at 23° C. in 0.125% strength by weight tetrahydrofuran solution at a flow rate of 1.5 ml/min by reference to calibration curves for polystyrene or polybutadiene (calibrating substances Mw/Mn=about 1) [cf. G. Glockner, Polymercharakterisierung durch Flussigkeitschromatographie, Verlag A. Huthig, Heidelberg, 1982];

base nitrogen by potentiometric titration with perchloric acid in a chlorobenzene/glacial acetic acid mixture; total nitrogen by the Kjeldahl method;

acid number determination: titrimetrically using 0.1N KOH in a mixture of toluene/methanol against phenolphthalein.

EXAMPLE 1

A thermostatable 2-liter reaction vessel equipped with stirrer and thermometer and sealed gas-tight with a silicone membrane and rinsed out under pure nitrogen with a solution of n-butyllithium in cyclohexane is charged with 500 ml of cyclohexane and 100 g of styrene. At 40° C. a 1.4 molar solution of secbutyllithium in cyclohexane is added to the styrene solution with thorough stirring with a hypodermic syringe until a slight yellow color persists. A further 10 mmol of sec-butyllithium are then added. The solution, which then has a deep orange color, warms up. After 1 hour the polymerization has ended. Using a hypodermic syringe the solution is titrated with benzylidenemethylamine. After 1.2 g of aminating reagent (0.01 mol) has been added, the orange color disappears. The solution is maintained at 40° C. for a further 15 minutes. A small sample is taken from the reaction vessel for analysis, which is followed by precipitation, isolation and drying (polymer A1). Thereafter 1.55 g of tert-butyl chloroacetate are injected into the reaction vessel.

After a further 15 minutes the polymer is precipitated by pouring the solution with intensive stirring into 5 l of ethanol, filtered off and dried at 50° C. under reduced pressure (polymer B1).

30 g of polymer B1 were dissolved in 300 ml of toluene, 1.5 g of p-toluenesulfonic acid were added, and the mixture was stirred at 80° C. for 8 hours. Thereafter the polymer was again precipitated in ethanol, washed repeatedly with an ethanol/water mixture, isolated and dried as described (polymer C1).

The polymers were characterized as follows:
Molecular weight [Mn]:10,000 (polymer A1)
Base nitrogen [% by weight]:0.14 (polymer A1)
Total nitrogen [% by weight]:0.14 (polymer A1)
Acid number [mg of KOH/g]:5.5 (polymer C1)

EXAMPLE 2

Example 1 was repeated to prepare a living poly(styryl)lithium from 80 g of monomeric styrene and 28.5 mmol of sec-butyllithium in 500 ml of cyclohexane, except that the polymerization was terminated with 1,5-diazabicyclo[3,1,0]hexane. On addition of 2.4 g of aminating reagent the reaction batch turned colorless.

After removal of a small sample (polymer A2), 4.3 g of tert-butyl chloroacetate were injected into the reaction vessel.

The polymer was precipitated and isolated as in Example 1 (polymer B2). An aliquot of B2 was as described acid-hydrolyzed to eliminate the ester function (polymer C2). The polymers had the following analytical data:
Molecular weight [Mn]:2,800 (polymer A2)
Base nitrogen [% by weight]:0.95 (polymer B2)
Total nitrogen [% by weight]:0.97 (polymer B2)
Acid number [mg of KOH/g]:18 (polymer C2)

EXAMPLE 3

To prepare a 2-block copolymer comprising 20% by weight of styrene and 80% by weight of butadiene units, a 6 reactor equipped with stirrer, thermometer, reflux condenser, silicone membrane and heating jacket is cleaned by boiling out with cyclohexane containing 5 cm³ of sec-butyllithium under pure nitrogen. After this solution was discharged, the reactor was charged with 3,000 cm³ of cyclohexane and 100 g of styrene. After the active proton impurities still present had been titrated away as described in Example 1, 25 mmol of sec-butyllithium were added, and the styrene was polymerized at 65° C. for 1 hour. Thereafter 400 g of 1,3-butadiene which had been purified by distillative removal of butyllithium were fed in at that temperature a little at a time. Two hours after the addition was complete, a sample was removed from the reaction vessel. The block copolymer was precipitated in ethanol, isolated and dried. It had an Mn molecular weight of 19,000.

The remaining living polymer solution was mixed with 3.2 g of N,N'-diisopropylcarbodiimide by means of a hypodermic syringe. After a further 15 minutes, 5.7 g of isobutyl 4-chloromethylbenzoate were injected into the reaction vessel. The solution was stirred for a further 30 minutes. The polymer was then precipitated in ethanol, admixed with a commercial stabilizer (for example ®Kerobit TBK) and dried at 50° C. under reduced pressure.

10 g of the block copolymer were dissolved in 100 ml of toluene and stirred at 65° C. with 0.5 g of p-toluenesulfonic acid for 12 hours. The polymer was again precipitated in ethanol, repeatedly washed with an ethanol/water mixture and dried at 50° C. under greatly reduced pressure.

The polymer was found to have a nitrogen content of 0.14% by weight (Kjeldahl). The acid number was 2.7 [mg of KOH/g of polymer].

EXAMPLE 4

To prepare a hydrogenated random copolymer having carboxyl end groups, a 10-1 reactor equipped with stirrer, thermometer, heating jacket and appropriate inlet means was cleaned by boiling out under pure nitrogen as described in Example 3. The reactor was then charged with 5,140 cm³ of cyclohexane, 50 cm³ of tetrahydrofuran, 500 g of styrene and 500 g of purified 1,3-butadiene. After the impurities had been titrated away, 58.8 mmol of sec-butyllithium were added at 40° C. The polymerization was carried out with jacket cooling at 65° C. for 2 hours. A sample was removed from the reactor. The random styrene/butadiene copolymer had an average molecular weight (Mn) of 17,000.

The living polymer solution was admixed with 11.7 g(=65 mmol) of benzylideneaniline, followed after a further 15 minutes by 9.7 g (=65 mmol) of tert-butyl chloroacetate.

After 15 minutes a sample was taken, precipitated, isolated and dried. The sample was found to have a Kjeldahl nitrogen content of 0.082% by weight.

The remaining reaction batch was admixed with a hydrogenating catalyst solution of 1.3 g of nickel(II) acetylacetonate dissolved in 40 ml of toluene and admixed with a further 30 ml of a solution of triisobutylaluminum (20% strength by weight in hexane). The reactor was subjected to 15 bar of hydrogen, and its contents were hydrogenated at 56° C. for 8 hours. The proportion of olefinically unsaturated bonds had thereafter dropped to 3% of the unsaturation originally present (determination by Fourier transform infrared spectroscopy).

The selectively hydrogenated random copolymer is precipitated, isolated and treated in solution with p-toluenesulfonic acid in the same way as in the preceding Examples.

A carefully purified sample of the isolated material was found to have an acid number of 3.1 [mg of KOH/g of polymer].

We claim:
1. A functionally modified homopolymer, random copolymer and/or block copolymer of styrene and an anionically polymerizable conjugated $C_4$-$C_{12}$-diene, which contains one functional endgroup of the formula (I):

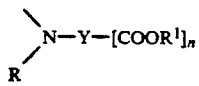 (I)

where Y is a hydrocarbon chain of from 1 to 20 carbon atoms, R is an organic radical selected from the group consisting of methyl, ethyl, n-butyl and tert.-butyl, $R^1$ is alkyl, cycloalkyl or aryl, and n is a whole number greater than or equal to 1, as obtained by reacting said polymer functionally modified with a functional group of the formula (II):

in the presence of a polar or apolar solvent with a compound of the formula (III):

where Me is an alkali metal, X is halogen and Y, R, n and $R^1$ have the above mentioned meanings.

2. The polymer of formula (I) of claim 1, as obtained by anionically polymerizing or copolymerizing styrene and the said diene, to obtain a living polymer, reacting the living polymer with a nitrogen compound capable of forming the functionally modified polymer (II), and reacting the polymer of formula (II) with a compound of formula (III).

3. A polymer as defined in claim 1, wherein Y is a branched or unbranched hydrocarbon chain of 1 to 20 carbon atoms, $R^1$ is hydrogen or alkyl of 1 to 7 carbon atoms and n is 1 to 3.

* * * * *

UNITED STATES PATENT AND TRADEMARK OFFICE
CERTIFICATE OF CORRECTION

PATENT NO. : 5,064,907
DATED : November 12, 1991
INVENTOR(S) : Klaus BRONSTERT et al It is certified that error appears in the above-identified patent and that said Letters Patent is hereby corrected as shown below:

On the title page: Foreign Application Priority Data, item [30]

"Aug. 7, 1988" should read --Aug. 7, 1987--

Signed and Sealed this

Twenty-fifth Day of May, 1993

Attest:

MICHAEL K. KIRK

*Attesting Officer*     Acting Commissioner of Patents and Trademarks